United States Patent
Tagaya

(10) Patent No.: US 11,606,484 B2
(45) Date of Patent: Mar. 14, 2023

(54) IMAGE PICKUP APPARATUS

(71) Applicant: CANON KABUSHIKI KAISHA, Tokyo (JP)

(72) Inventor: Akira Tagaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/479,570

(22) Filed: Sep. 20, 2021

(65) Prior Publication Data

US 2022/0094821 A1 Mar. 24, 2022

(30) Foreign Application Priority Data

Sep. 23, 2020 (JP) .............................. JP2020-158872

(51) Int. Cl.
*H04N 5/225* (2006.01)
*H04N 5/232* (2006.01)

(52) U.S. Cl.
CPC ........... *H04N 5/2252* (2013.01); *H04N 5/232* (2013.01)

(58) Field of Classification Search
None
See application file for complete search history.

(56) References Cited

U.S. PATENT DOCUMENTS

| | | | | |
|---|---|---|---|---|
| 4,903,062 A * | 2/1990 | Kirigaya | ................ | G03B 17/18 396/287 |
| 5,184,173 A * | 2/1993 | Kirigaya | ................ | G03B 17/18 396/281 |
| 10,197,892 B2 * | 2/2019 | Nakano | ..................... | G01K 1/14 |
| 2002/0090212 A1 * | 7/2002 | Shimamura | ............ | G03B 17/08 348/E5.026 |
| 2014/0197649 A1 * | 7/2014 | Hansen | ................... | B60R 11/04 396/428 |
| 2017/0366885 A1 * | 12/2017 | Wright | ..................... | H04R 1/02 |
| 2020/0094781 A1 * | 3/2020 | Ota | ......................... | B60S 1/026 |
| 2021/0255457 A1 * | 8/2021 | Ide | ..................... | G02B 27/0006 |
| 2021/0368588 A1 * | 11/2021 | Semba | ..................... | H05B 3/84 |

FOREIGN PATENT DOCUMENTS

JP 06-98212 A 4/1994

* cited by examiner

*Primary Examiner* — Cynthia Segura
(74) *Attorney, Agent, or Firm* — Cowan, Liebowitz & Latman, P.C.

(57) ABSTRACT

An image pickup apparatus 100 has a casing; a camera unit configured to be disposed in the casing and hold a lens; a protecting member 140 configured to protect the camera unit; and a holding member configured to hold the protecting member 140 and to be rotatably held to the casing around a shaft serving as a central axis. The holding member is rotatable between a first position at which the protecting member 140 is fixed to the casing and a second position at which the protecting member 140 is attachable to and detachable from the casing.

15 Claims, 3 Drawing Sheets

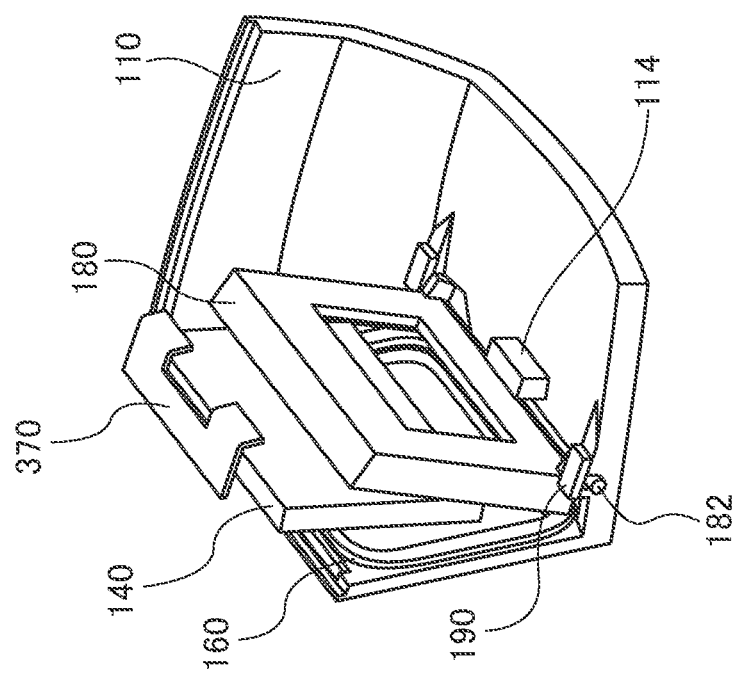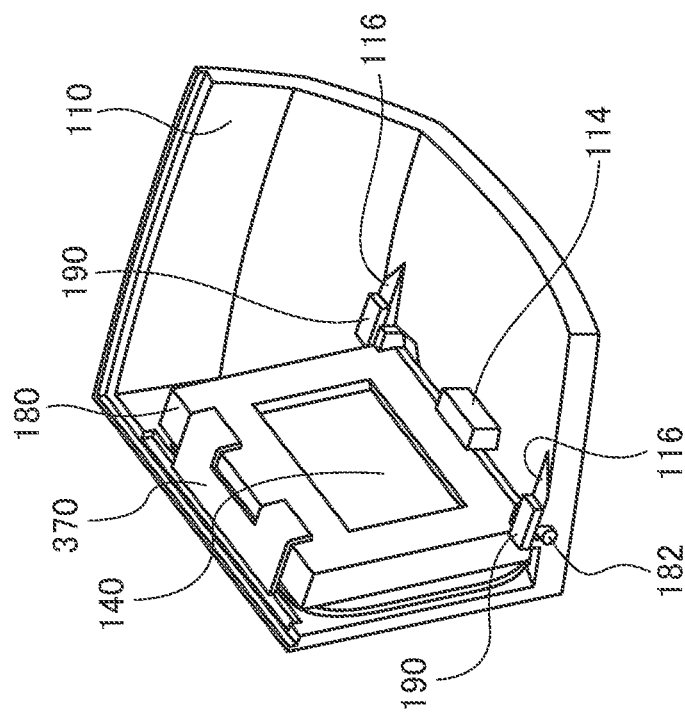

IMAGE PICKUP APPARATUS

BACKGROUND OF THE INVENTION

Field of the Invention

The present invention relates to an image pickup apparatus.

Description of the Related Art

It has conventionally been assumed that network cameras are installed under various environments. For example, assuming that a network camera is installed on the outside of a vehicle, there are cases in which dew condensation occurs on a camera window due to a rapid change in environmental temperature. In cold regions, the camera window is sometimes covered with snow or frozen due to snowfall. Subsequently, the shooting range is blocked by dew condensation or snow, and as a result, a desired image may fail to be recorded. To prevent this, some types of network cameras are provided with a heater that heats the camera window. Additionally, in some types of network cameras, a glass material is used for the camera window to enhance the heating efficiency.

Additionally, in a network camera installed outside a vehicle, the camera window may be broken due to flying stones or an external impact. If the camera window becomes too dirty or damaged, there is a need to replace just the camera window. It is preferable that the replacement operation is as simple as possible and preferable that heater parts and the parts for holding the heater, which are separate from the camera window, can be replaced without being disassembled.

In an image pickup apparatus disclosed in Japanese Patent Application Laid-Open No. 06-98212, a heater glass is fixed to a casing. Accordingly, if the heater glass becomes dirty or damaged, the casing needs to be disassembled into small pieces or the casing including the heater glass needs to be replaced with a new one, and it is impossible to replace the glass as a single component. In addition, the heater glass is attached to the casing, and thus, an external impact tests the strength of the glass, and the glass may be broken.

SUMMARY OF THE INVENTION

In view of the foregoing, an embodiment of the present invention provides an image pickup apparatus that is advantageous in improving the operability of replacing a lens protection member by the user.

An image pickup apparatus according to an embodiment of the present invention comprises: a casing; a camera unit configured to be disposed in the casing; a protecting member formed of a transparent member and configured to protect the camera unit; and a holding member configured to hold the protecting member and to be rotatably held to the casing around a shaft serving as a central axis, wherein the holding member is rotatable between a first position in which the protecting member is fixed to the casing and a second position in which the protecting member is attachable to and detachable from the casing.

Further features of the present invention will become apparent from the following description of exemplary embodiments with reference to the attached drawings.

BRIEF DESCRIPTION OF THE DRAWINGS

FIGS. 4A and 4B are perspective views illustrating a configuration of the rotation of a holder of the image pickup apparatus according to the present embodiment.

DESCRIPTION OF THE EMBODIMENTS

Figure 1:
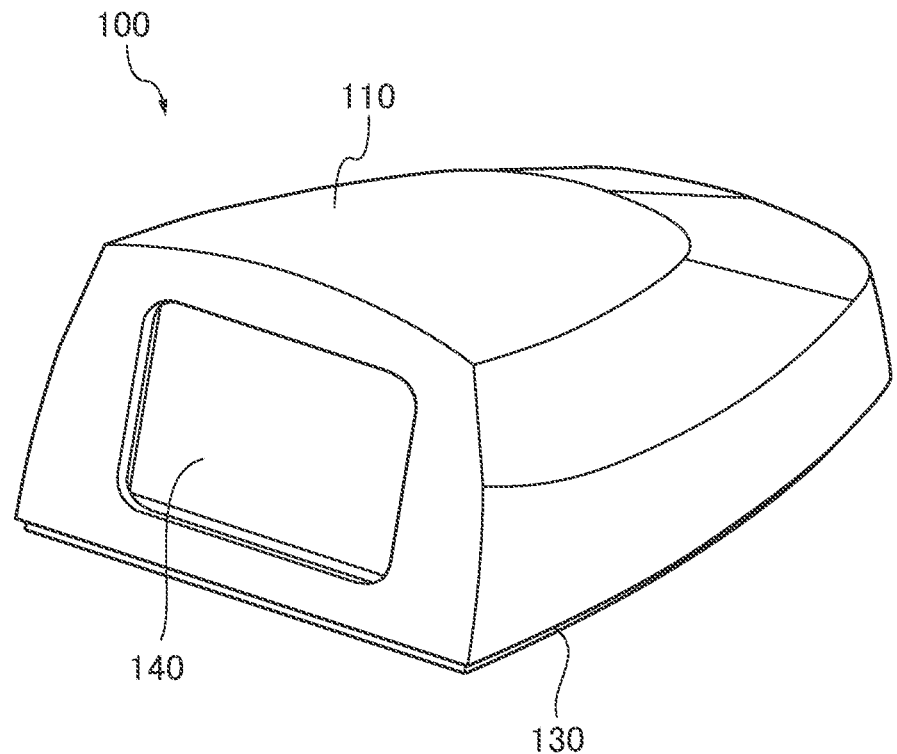
FIG. 1 is an overall view of an image pickup apparatus according to the present embodiment.

Embodiments of the present invention will be described below with reference to the drawings. In this case, in each drawing, the same reference numerals are provided for the components that have the same functions and redundant description will be omitted. Note that the configuration described in the embodiments below is merely an example, and the present invention is not limited to the configuration shown in the drawings.

Embodiment

In the present embodiment, a network camera will be described as an example of an image pickup apparatus.

FIG. 1 is an overall view of an image pickup apparatus 100 according to the present embodiment. The image pickup apparatus 100 can perform the shooting and recording of images. The image pickup apparatus 100 has a casing, and the casing includes atop cover 110 and a bottom cover 130. The top cover 110 and the bottom cover 130 can be respectively made by, for example, metal die casting or resin molding by using polycarbonate and the like. The bottom cover 130 is provided with an installation hole, and is fixed, for example, to the outside (exterior) of a vehicle by using screws and the like. The top cover 110 and the bottom cover 130 are fastened to each other by screws and the like.

A lens protection member 140 (a protecting member) assumes the role of protecting a lens and other parts contained in the casing from shock and dust. Since image shooting is performed through the lens protection member 140, the lens protection member 140 serves as an optical component in which transparency and dimensional accuracy are important. That is, the lens protection member 140 is formed of a transparent member. The lens protection member 140 is preferably made of, for example, glass or transparent polycarbonate.

Figure 2:
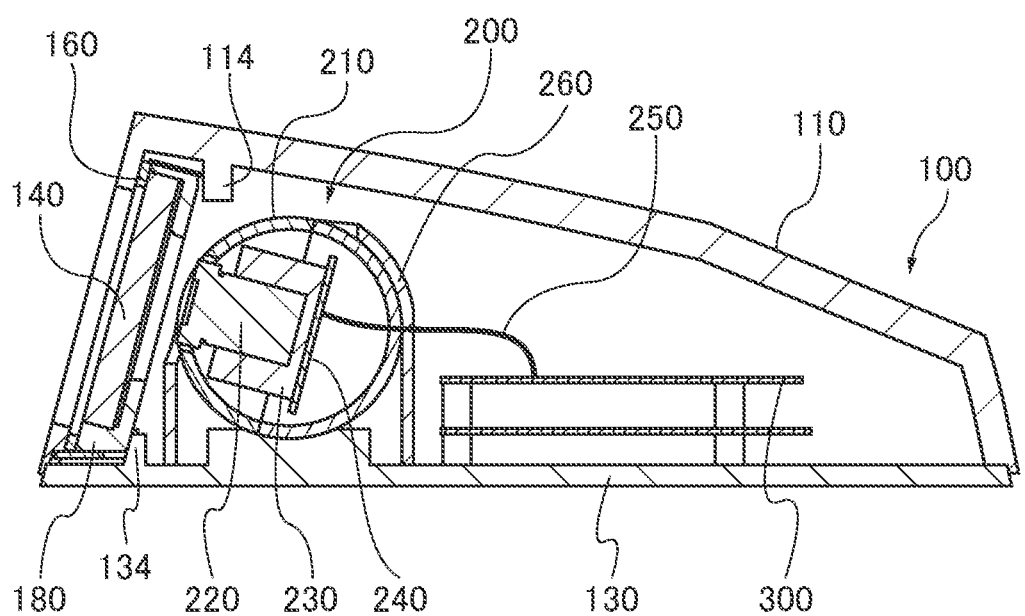
FIG. 2 is a cross-sectional view of the image pickup apparatus according to the present embodiment.

FIG. 2 is a cross-sectional view of the image pickup apparatus 100 according to the present embodiment. An elastic member 160 having an opening at a position corresponding to a shooting range of a lens unit (a camera unit) to be described below is fixed inside the top cover 110. The elastic member 160 is disposed between the top cover 110 and the lens protection member 140 in a pressed state, and prevents water and dust from entering the inside of the casing. The elastic member 160 is made of, for example, silicone rubber. The lens protection member 140 is held by a holder 180 (holding member) having an opening at a position corresponding to the shooting range, and the holder 180 is rotatably held by the top cover 110. The holder 180 is made of resin molding by using, for example, polycarbonate or PBT. A receiving part 114 is formed on a surface (back surface) of the top cover 110 on a side where the holder 180 is disposed. Similarly, a bottom receiving part 134 is formed on a surface (back surface) of the bottom cover 130 on the side where the holder 180 is disposed. In a state in which the holder 180 holds the lens protection member 140 (in a first position), there is a space between the receiving part 114 and the bottom receiving part 134 and the holder 180. The receiving part 114 and the bottom receiving part 134 receive the holder 180. Specifically, for example, when an external force is applied to the lens protection member 140 from the front side to deform, causing the lens protection member 140, the receiving part 114 and the bottom receiving part 134 to be brought into contact with the holder 180.

An approximately spherical lens unit 200 is further disposed inside the casing. The lens unit 200 includes a lens 220, a lens holder 230, an imaging substrate 240 having an imaging element, and a lens cover 210. The lens 220 is screwed in and held by the lens holder 230 and the positioning adjustment is possible in the optical axis direction for adjusting the focus. The imaging substrate 240 is fixed to the lens holder 230 by adhesion or the like. The lens holder 230 is held and fixed by the lens cover 210. An opening portion for image shooting is formed in front of the lens cover 210, and a hole for passing a wire 250 or the like is formed in the rear of the lens cover 210. The lens cover 210 can be made, for example, by metal die casting or resin molding by using polycarbonate.

The lens unit 200 is held so as to be covered by a cover holding member 260 and the bottom cover 130, and tilting and rotation operations are possible. The cover holding member 260 continuously opens from the horizontal position to the vertical position, which is a shooting range. Thus, the range of the tilting operation is regulated. The cover holding member 260 is fixed so as to enable a panning rotation, thereby enabling the lens unit 200 to perform a panning operation. The cover holding member 260 can be made, for example, by resin molding by using polycarbonate.

A control substrate 3M) is accommodated in the casing. The control substrate 300 assumes the role of control function for the entire image pickup apparatus 100, including heater control, power supply, camera control, and connection to a network. The control substrate 300 and the imaging substrate 240 are electrically connected by the wire 250 and the like. The lens unit 200 converts the light received through the lens protection member 140 and the lens 220 into an electric signal by the imaging substrate 240 and transmits it to the control substrate 300. Subsequently, the control substrate 300 records and distributes the received image data to the network.

Figure 3:
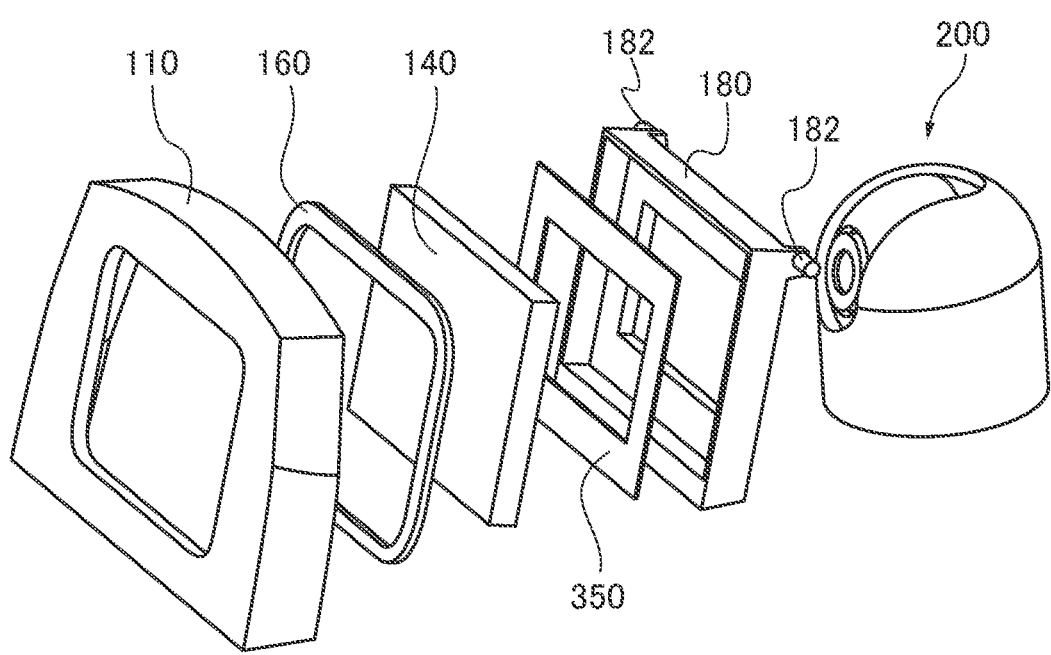
FIG. 3 is a partial exploded view including a heater according to the present embodiment.

FIG. 3 is a partially exploded view including a heater 350 according to the present embodiment. The top cover 110, the elastic member 160, the lens protection member 140, a heater 350, the holder 180, and the lens unit 200 are arranged in this order from the outside of the imaging device 100. The heater 350 has an opening for a shooting range and is fixed to the holder 180 by tape and the like. The position of the heater 350 is not limited to that shown in the drawing, and it suffices if the heater 350 is disposed such that the lens protection member 140 can be heated. The heater 350 is electrically connected to the control substrate 300 by a wire or FPC connection. The heater 350 is configured by, for example, an FPC heater and a rubber heater.

In the present embodiment, the lens protection member 140 is brought into contact with the heater 350 by the pressing of the elastic member 160. The lens protection member 140 is held to the holder 180 together with the heater 350.

The holder 180 has two pivot shaft members 182. The holder 180 is rotatably held on the top cover 110 by using a shaft (pivot shaft) formed by the pivot shaft members 182 as a central axis. The pivot shaft formed by the pivot shaft members 182 is disposed at a position where it does not overlap with the lens unit 200 in the projection direction from the front of the casing. In other words, the pivot shaft formed by the pivot shaft members 182 is disposed at a position in which the pivot shaft does not overlap with the lens unit 200 when the holder 180 is viewed from a direction in which the lens protection member 140 is disposed.

The electric heating method of the heater 350 will now be described. The control substrate 300 supplies a current to the heater 350 based on information about a temperature sensor and the like. Since the heater 350 has a resistance, it generates heat overall due to the current received from the control substrate 300. The control substrate 300 has a plurality of target values for the heating temperature of the heater 350. For example, when an outside air temperature is below freezing, the time taken for supplying a current to the heater 350 so that the temperature of the heater 350 reaches a temperature at which ice and snow can be melted is long. In contrast, when the temperature is not below freezing but there is a concern that dew condensation will occur, heating of the heater 350 is suppressed by shortening a time taken for supplying a current to the heater 350. Additionally, no current is supplied in a situation in which heating is not necessary. The heat of the heater 350 generated by current supply of the control substrate 300 is transmitted to a frame part of the lens protection member 140. The transmitted heat gradually moves to the center of the lens protection member 140. As a result, the entire lens protection member 140 is warmed to prevent dew condensation, adhesion of snow, and freezing in a shooting range.

In addition to securing the waterproofing and dustproofing described above, the elastic member 160 prevents heat transmitted to the lens protection member 140 from being transmitted to the casing. The holder 180 is made of resin, which thereby reduces heat conduction to the casing. Thus, the heater 350 can efficiently heat only the lens protection member 140. Additionally, it is preferable that a glass material having a high thermal conductivity is used for the material of the lens protection member 140 so that a uniform temperature distribution of the lens protection member 140 can be obtained. Further, it is further preferable that tempered glass having a thickness of about 5 mm is used for the lens protection member 140 in order to withstand heat and external impact.

FIGS. 4A and 4B are perspective views illustrating a configuration of the rotation of the holder 180 of the image pickup apparatus 100 according to the present embodiment. FIG. 4A illustrates a state in which the holder 180 is fixed at the first position. When the holder 180 is at the first position, the holder 180 holds the lens protection member 140. In other words, when the holder 180 is at the first position, the lens protection member 140 is fixed to the holder 180.

Bearing parts 116 are formed on the top cover 110, and hold the pivot shaft members 182 of the holder 180. The pivot shaft members 182 are rotatably fixed to the top cover 110 by pivot fixing members 190. The pivot fixing members 190 are fixed to the top cover 110 by using screws and the like. The pivot fixing members 190 are made by metal die casting or resin molding by using polycarbonate and the like.

A holder fixing member 370 (regulating member) is fixed to the top cover 110 by using screws and the like so as to hold the back surface of the holder 180 and regulate the rotation of the holder 180. The holder fixing member 370 is preferably made of a metal material having a spring property. The receiving part 114 that is formed on the top cover 110 is located between the pivot shaft members 182, which is substantially at the center of the casing. When the holder 180 is fixed at the first position, the receiving part 114 is not in contact with the holder 180. That is, when the holder 180 is fixed at the first position, there is a space between the receiving part 114 and the holder 180.

A case in which an impact or an external force is applied to the lens protection member 140 will now be described. When an external force is applied to the lens protection member 140 in a state in which the lens protection member 140 is fixed to the holder 180, the force is transmitted to the holder 180 that holds the lens protection member 140. Since the two pivot shaft members 182 of the holder 180 are held by the top cover 110 and the pivot fixing members 190, the center of the holder 180 is deformed like a both ends supported beam. Subsequently, the back surface of the holder 180 is brought into contact with the receiving part 114 of the top cover 110, and further deformation is prevented. That is, the receiving part 114 is disposed at a position at which the receiving part 114 contacts the holder 180 when the lens protection member 140 is deformed due to the external force applied to the lens protection member 140. The holder 180 has an elastic deformation region because it is formed of resin. That is, it is possible to suppress the amount of deformation of the holder 180 within the range of the elastic deformation region by the receiving part 114. As a result, the pivot shaft members 182 are prevented from being damaged by impact or an external force. Additionally, the deformation of the holder 180 leads to reducing an impact force. Therefore, damage to the lens protection member 140 made of glass and the like can also be prevented.

FIG. 4B illustrates a state in which the holder 180 rotates (moves) to a second position in which the lens protection member 140 can be replaced. When the holder 180 is at the second position, in which the lens protection member 140 can be replaced, the lens protection member 140 is attachable to and detachable from the top cover 110. The procedure for replacing the lens protection member 140 is as follows. First, the holder fixing member 370 fixed to the top cover 110 is removed. Then, the holder 180 enters a state in which it can be rotated between the first position and the second position. Subsequently, the holder 180 is rotated to the inside of the casing around an axis formed by the pivot shaft members 182. Consequently, the lens protection member 140 can be removed (an attachable and detachable state) and only the lens protection member 140 is removed. In the present embodiment, since the rotation of the holder 180 is regulated by the receiving part 114, the holder 180 does not come into contact with the lens unit 200. Since the pivot shaft members 182 of the holder 180 are fixed by the pivot fixing members 190, the holder 180 does not separate from the top cover 110. Further, since the heater 350 is fixed to the holder 180 and the elastic member 160 is fixed to the top cover 110, these components do not separate independently. As a result, the user can easily replace just the lens protection member 140.

As described above, according to the present embodiment, it is possible to improve the user's operability in replacing the lens protection member 140 of the camera provided with the heater 350. Additionally, according to the present embodiment, it is possible to provide the image pickup apparatus that reduces an external impact and reduces the probability of causing damage of the holder 180 that holds the lens protection member 140 and the heater 350.

In the above embodiment, although the casing is configured by two components, it may be configured by three or more components. Additionally, in the above-described embodiment of the present invention, the top cover 110 and the bottom cover 130 may be fixed by using claw fitting or adhesion.

In the above-described embodiment, the control substrate 300 and the imaging substrate 240 may be electrically connected by using a flexible board, a flat cable, a thin line coaxial cable, and a relay substrate. Additionally, in the above-described embodiment, the heater 350 and the control substrate 300 may be connected by using the relay substrate. Additionally, in above-described embodiment, the heater 350 may be a film heater in which the shooting range is transparent.

Further, in the above-described embodiment, a waterproof sealing material or a foaming agent may be used for the elastic member 160. In the above-described embodiment, an acrylic resin, sapphire glass, or the like may be used for the lens protection member 140. In the above-described embodiment of the present invention, another component, for example, a metal shaft, may be used to form the pivot shaft members 182 of the holder 180. Further, in the above-described embodiment, a cushioning material may be disposed between the holder 180 and the receiving part 114 to further enhance cushioning properties. Additionally, in the above-described embodiment, the holder fixing member 370 may be fixed to the top cover 110 by using a claw fit or a tape.

Other Embodiments

Although the present invention has been described in detail with reference to the preferred embodiment, the present invention is not limited to the above-described embodiment and various modifications are possible based on the gist of the present invention and they are not excluded from the scope of the present invention.

This application claims the benefit of Japanese Patent Application No. 2020-158872, filed Sep. 23, 2020, which is hereby incorporated by reference herein in its entirety.

What is claimed is:

1. An image pickup apparatus comprising:
   a casing;
   a camera unit configured to be disposed in the casing;
   a protecting member formed of a transparent member and configured to protect the camera unit; and
   a holding member configured to hold the protecting member, has a plurality of shafts and to be rotatably held to the casing around the plurality of shafts,
   wherein the holding member is rotatable between a first position in which the protecting member is fixed to the casing and a second position in which the protecting member is attachable to and detachable from the casing.

2. The image pickup apparatus according to claim 1 further comprising a heater configured to heat the protecting member,
   wherein the holding member holds the heater.

3. The image pickup apparatus according to claim 2, wherein the heater is fixed to the holding member.

4. The image pickup apparatus according to claim 2, wherein the heater and the holding member are open at positions corresponding to a shooting range of the camera unit.

5. The image pickup apparatus according to claim 2, wherein the protection member and the heater come into contact with each other.

6. The image pickup apparatus according to claim 1, wherein the shafts are disposed at a position in which the shafts do not overlap the camera unit in a case where the holding member is viewed from a direction in which the protection member is disposed.

7. The image pickup apparatus according to claim 1, wherein the shafts are rotatably fixed to the casing by a shaft fixing member.

8. The image pickup apparatus according to claim 1, wherein the casing has a receiving part that is disposed more toward the inside than the holding member and receives the holding member.

9. The image pickup apparatus according to claim 8, wherein there is a space between the receiving part and the holding member.

10. The image pickup apparatus according to claim 9, wherein the receiving part is disposed at a position at which the receiving part is brought into contact with the holding member in a case in which the holding member is deformed due to an external force applied to the protecting member.

11. The image pickup apparatus according to claim 1, wherein the protecting member is made of a glass material.

12. The image pickup apparatus according to claim 1, wherein an elastic member is disposed between the casing and the protecting member.

13. The image pickup apparatus according to claim 12, wherein the elastic member is fixed to the casing.

14. The image pickup apparatus according to claim 1, wherein the casing is disposed outside a vehicle.

15. The image pickup apparatus according to claim 1, further comprising a regulating member configured to be detachable from the casing and fixed to the casing so that the rotation of the holding member is regulated.

* * * * *